United States Patent
Nara et al.

(10) Patent No.: US 9,714,678 B2
(45) Date of Patent: Jul. 25, 2017

(54) LINEAR MOTION GUIDE UNIT

(71) Applicant: NIPPON THOMPSON CO., LTD., Tokyo (JP)

(72) Inventors: Tsuguyoshi Nara, Mino (JP); Hideki Kuwabara, Mino (JP)

(73) Assignee: NIPPON THOMPSON CO., LTD., Tokyo (JP)

( * ) Notice: Subject to any disclaimer, the term of this patent is extended or adjusted under 35 U.S.C. 154(b) by 0 days.

(21) Appl. No.: 15/078,141

(22) Filed: Mar. 23, 2016

(65) Prior Publication Data

US 2016/0281777 A1 Sep. 29, 2016

(30) Foreign Application Priority Data

Mar. 26, 2015 (JP) .................. 2015-064233

(51) Int. Cl.
*F16C 29/06* (2006.01)
*F16C 29/00* (2006.01)

(52) U.S. Cl.
CPC .......... *F16C 29/063* (2013.01); *F16C 29/005* (2013.01); *F16C 29/0602* (2013.01)

(58) Field of Classification Search
CPC .................................................. F16C 29/063
See application file for complete search history.

(56) References Cited

U.S. PATENT DOCUMENTS

| | | | | |
|---|---|---|---|---|
| 4,799,806 A * | 1/1989 | Seki | ...................... | F16C 29/063 384/45 |
| 5,624,195 A * | 4/1997 | Abe | ...................... | F16C 29/063 384/15 |
| 7,008,107 B2 * | 3/2006 | Kuwabara | ............. | F16C 29/063 384/43 |
| 8,303,183 B2 * | 11/2012 | Chen | ...................... | A47B 88/14 312/334.11 |
| 9,416,819 B2 * | 8/2016 | Taylor | ................... | F16C 29/004 |

FOREIGN PATENT DOCUMENTS

| JP | 62037510 A | 2/1987 |
|---|---|---|
| JP | 08200363 A | 8/1996 |
| JP | 2006009841 A | 1/2006 |

* cited by examiner

*Primary Examiner* — Thomas R. Hannon
(74) *Attorney, Agent, or Firm* — Browdy and Neimark, PLLC

(57) ABSTRACT

A slider is composed of four components except for rolling elements. A slider moving relatively to a guide rail is composed of a carriage having raceway grooves, a circulator to make a return passage and insert nuts to fit into through-holes in the circulator. Engaging parts of the carriage makes fit-engagement with holes in the circulator to make snap-fit between the carriage and the circulator to fasten them each other.

9 Claims, 14 Drawing Sheets

LINEAR MOTION GUIDE UNIT

FIELD OF THE INVENTION

The present invention relates to a linear motion guide unit composed of a guide rail of U-shaped cross section having a raceway groove therein guide rail and a slider that fits over or conforms to the guide rail for linear movement relative to the guide rail.

BACKGROUND OF THE INVENTION

Modern linear motion guide units in recent years are demanded to perform high-precious tasks on reciprocating parts for a variety of instruments including in various reciprocating parts or components including semiconductor manufacturing machines, assembling machines, medical instruments, inspection and/or measurement devices. Members and/or parts for the linear motion guide units are required to make as integral as possible to decrease any errors and steps in assembly. Moreover, slider is desired to free of any working such as small holes, threaded holes and so on. The linear motion guide units may be indispensable machine elements for machines to guide linearly the slider with nimbleness.

There has been already known a linear motion guide system with a lubrication construction which may be supplied with lubricant from the exterior, which is disclosed in, for example Japanese Laid-Open Patent Application No. H08-200 363. With the linear motion guide system constructed as stated earlier, a guide rail has on an inside surface thereof a groove allowing a load ball to roll through there and a slider has on an outside thereof a groove allowing a load ball to roll through there. The slider fits loosely in the guide rail to provide a circuit having non-load ball circuit in the slider. Thus, more than one ball is allowed to roll through load-ball rolling grooves in the non-load ball circulating circuits to move slider in an axial direction of the guide rail. With the linear guide system constructed as stated earlier, a lubricant injection port is made to communicate with the non-load ball circulating circuits. With the linear guide system constructed as stated earlier, the circulating circuits have the lubricant injection ports to communicate with the non-load ball circuit. The bottom plate of the guide rail has a lubricant port, which is allowed to communicate with the lubricant injection port after the slider has reached the preselected location in the guide rail.

In Japanese co-pending Published Patent Application No. S62-38 562, there is disclosed a linear motion roll-bearing composed of a bed of U-shaped configuration in cross-section of thin steel sheet and a table which fits in the bed for relatively linear movement with respect to the bed. With the prior linear motion roll-bearing constructed as stated earlier, the table fits over the circulator which has a looped circuit to allow the rolling elements to move along the raceway grooves in an endless manner. The table or the bed has no raceway groove at their lengthwise opposite ends thereof. Instead, there are provided lugs having fastening means to connect with any other members.

In another Japanese co-pending Laid-open Patent Application No. 2006-9 841, there is disclosed a linear motion guide unit in which the slider moving in a sliding manner along the track rail is composed of three members apart from the rolling members. The three members are fastened together to the carriage with no use of screws and so on to make it possible to accomplish extreme miniaturization. With the linear motion guide unit constructed as stated earlier, the slider moving in the gutter-shaped track rail is composed of a carriage having a load-carrying track groove and a non-loaded return groove, an upper lid to fit into the upper groove and a bottom lid to fit into lower groove in the carriage. The upper lid and the lower lid are fastened each other by means of pins extending through pin holes so as to grasp the carriage between the opposed lids.

With the linear motion roll-bearing constructed as stated earlier, however, as the circulator having the return passage and the turnaround passages of endless circuits is fastened with rivets in the table of thin steal sheet made U-shape in cross section, it has been required to set the combined circulators to the table and then squeeze rivets with using any press. This assembling procedure has had troublesome procedure. Moreover, because the prior linear motion roll-bearing leaves any clearance between, for example any locating holes in the carriage and the locating pins of the circulator, any rattling caused among parts leads to any discrepancy between parts, especially any misalignment in location between the scooping part of the circulator and the raceway groove of the carriage. As a result, the rolling elements are prevented from the smooth relative reciprocating movement and, therefore, the slider is hindered from smooth reciprocating movement relatively to guide rail.

SUMMARY OF THE INVENTION

The present invention, therefore, has as its principal object to make simple in construction the U-shaped guide rail of thin steel plate and the carriage to overcome the problems stated earlier and, in particular, to provide the linear motion guide unit in which the slider moving on the tack rail is constituted with three components, namely, the carriage and a pair of circulators to form endless circulating ways to make easier the fixture of these components. According to the present invention, the three components, namely, the carriage and a pair of circulators to form endless circulating ways are better for fixture in place of these components with leaving out troublesome procedures of assembly and keeping the cost down making sure of smooth movement of the slider.

Means to Solve the Problems

The present invention is concerned with a linear motion guide unit, comprising a guide rail of U-shaped configuration in transverse section having a bottom and longitudinal upright first sides extending side edges of the bottom and having on inside surface thereof first raceway grooves extending lengthwise of the first upright sides, and a slider having second raceway grooves extending in opposition to the first raceway grooves, and the slider being disposed between first sides for sliding movement to move through a rolling element in a load passage defined between the first raceway groove and the second raceway groove, the slider having a carriage, circulator and a rolling element, the carriage of thin steal plate being made in a U-shape in transverse section composed of an upper section and second side walls depending downwards from widthwise opposed side edges of the upper section and having the second raceway grooves on the outside surfaces thereof, the circulator arranged between the second side walls and having turnaround passages communicating with the load passage and a return passage communicating with the turnaround passages, and the rolling element running through a circulating passage composed of the load passage, turnaround passages and the return passage, and the carriage having the second side wall having the second raceway groove of a preselected length at an outside middle area thereof and further having cut-out portions at the lengthwise opposite ends of the second raceway groove, engaging parts at lengthwise opposite ends of the second raceway grooves, and the circulator having holes to fit over the engaging parts of the carriage whereby after the engaging parts of the carriage have fit in and engaged with the holes of the circulator, the carriage makes snap-fit over the carriage to make secure fixture between the carriage and the circulator.

In a linear motion guide unit of the present invention, a mating part of the circulator to fit into the hole of the carriage has a scooping part to scoop the rolling elements out of the load raceway into the turnaround passages and wherein the scooping part fits into the hole of the carriage to make communications to the second raceway groove.

In a linear motion guide unit of the present invention, a recess identical in transverse section and in configuration with the second raceway groove on transverse section is made to extend lengthwise on an extension of the second raceway groove outside the engaging part made on the second sidewall of the carriage, there is provided the convex wall surface which is allowed to fit into the recess of the engaging part. Further on one side of rectangular section of the hole of the circulator, there is provided the convex wall surface which is allowed to fit into the recess of the engaging part, and after the convex wall surface to form a wall surface of the hole has fitted into of the recess of the engaging part, the circulator is fastened mutually to the carriage.

The slider has insert nuts which have threaded holes used to fasten any counterpart such as works, instruments and so on. The circulator has first through-holes to press-fit the insert nuts therein, and the carriage has second through-holes lying at the same position with the first through-holes and having a size smaller than an outer diameter of the insert nut but larger than the fastening threaded hole.

In a linear motion guide unit of the present invention, the first through-hole in the circulator and the second through-hole in the carriage are made in pairs at widthwise midway in pairs along the lengthwise direction.

The circulator is composed of first and second circulator halves made of synthetic resins, each of which has a semicircular half curved passage for the turnaround passage and a semicircular half linear passage for the return passage. After hooked parts made widthwise midway the opposite ends of one of the circulators have made snap-fit engagement with recesses made widthwise midway the opposite ends of another of the circulators, the adjoining circulators are fastened each other. With the first circulator, a boundary between the end and the first middle portion in the first circulator is made in raised step in such a way a first middle area lying between the opposite ends is raised, and a boundary between the end and the second middle portion in the second circulator is made recessed to make a concaved step, so that the middle area of the first circulator is arranged to fit in the middle portion of the second circulator.

Moreover, the first circulator has hocked portions and further the first circulator has on an upper surface thereof locating knock-pins, which are used to fit into locating holes in the carriage to locate the first circulator underneath a lower surface of the carriage, and the second circulator has the recess to fit over the engaging part to make engagement with the hooked portion of the first circulator to lay the second circulator underneath the first circulator, and further the second circulator has the hole into which the engaging part of the carriage fits to be fastened to the carriage with the snap-fit engagement.

The opposite sides of the second circulator having the through-holes are made thicker than opposite sides of the first circulator, and a middle portion having the turnaround passage and the return passage is made thinner in thickness than the first circulator, and the first circulator and the second circulator are in alignment with each other to make in-row fitness.

Effect of the Invention

The mechanical strength of the linear motion guide unit is ensured by the carriage and the guide rail of stainless steal precisely formed in U-shape in transverse section. The slider is completed by the resiliently snap-fit assembly of the carriage and a pair of synthetic resin-made circulator halves having endless circulating circuits. Moreover, as the insert nuts are press-secured to the circulator of the slider, the counterparts such as works, instruments, and tools may be easily fastened by female mating with the insert nuts. With the linear motion guide unit of the present invention, furthermore, as there is no fear of integrated error in assembly of the slider, the assembly may be carried out easily with high precision. Moreover, the linear motion guide unit of the present invention makes it possible to carry out certainly with high precision locating among three members, that is, the carriage and two circulators. As a result, the slider is allowed to make smooth reciprocating movement relatively to the guide rail. Thus, the linear motion guide unit constructed as stated earlier is allowed to correspond smoothly with high precision to the sliding movement of the actuators and instruments. With the linear motion guide unit, moreover, the recess identical with the second raceway groove on transverse section is made to extend lengthwise on the extension of the second raceway groove outside the engaging part of the carriage and the recess fits over the convex wall surface of the hole of the circulator. Thus, as the recess serves as a provisional reference surface to locating the circulator relatively to the carriage, the carriage and the circulator are positioned easily with high precision. Accordingly, the circulator and the scooping part are easily located with accuracy. Then, the scooping part of the circulator and the second raceway groove of the carriage are located appropriately each other with accuracy so as not to cause any discrepancy between the scooping part and the second raceway groove, thereby allowing the rolling elements to roll with smooth through the circulating circuits to move the slider relatively with smooth along the guide rail. Though the carriage of the linear motion guide unit is made any thin steal plate, any counterparts such as instruments, tools and so on mounted on the carriage are fastened with female screws of the insert nuts press-fit into the circulators. Thus, the driving depth of the fastening screws of the slider is made deeper sufficient to fasten the counterparts with safety to the slider.

DETAILED DESCRIPTION OF THE PREFERRED EMBODIMENTS

Figure 1:
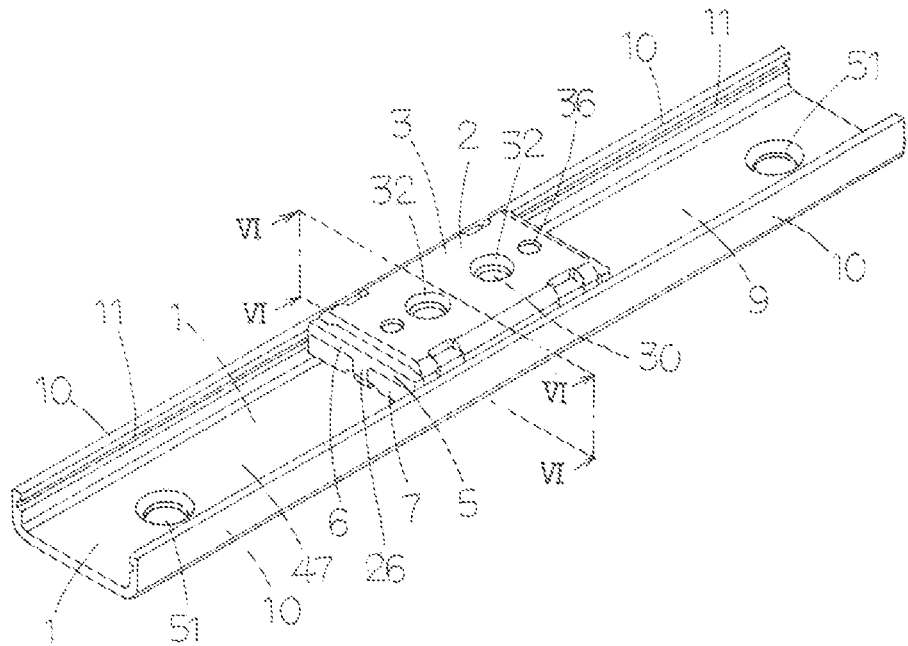
FIG. 1 is a view of appearance in perspective showing a preferred embodiment of a linear motion guide unit according to the present invention.
Figure 2:
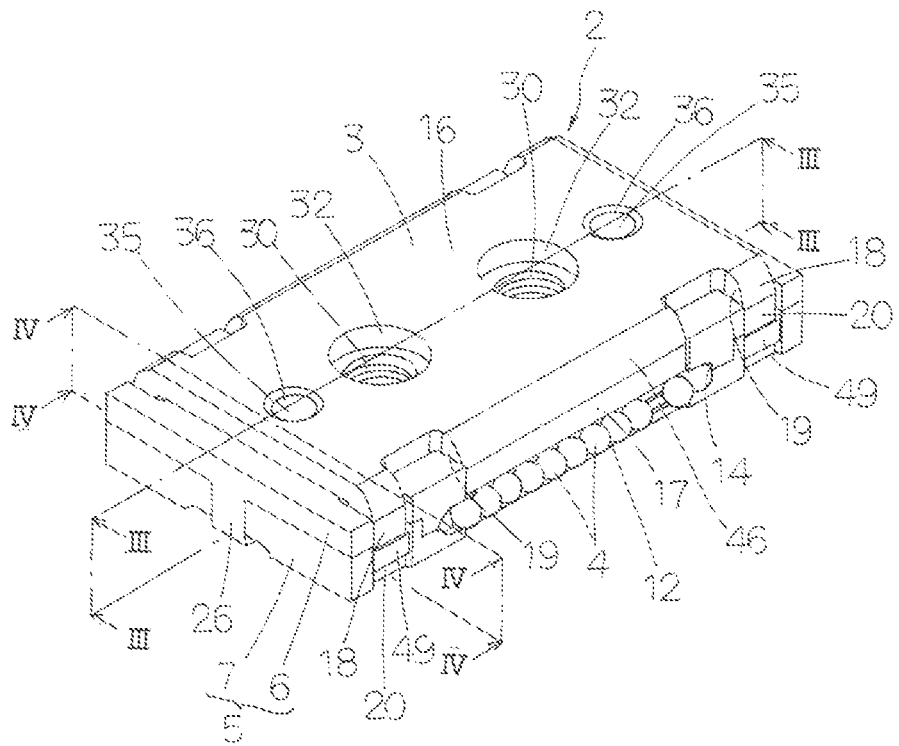
FIG. 2 is a view of appearance in perspective showing a slider to be incorporated in the linear motion guide unit of FIG. 1.
Figure 3:
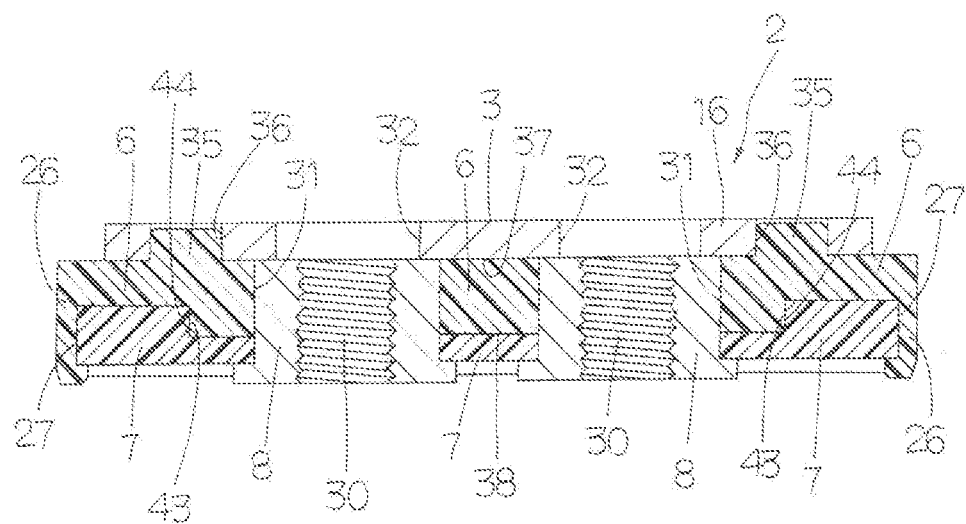
FIG. 3 is a view in transverse section of the slider taken on a plane lying on the line III-III of FIG. 2.
Figure 4:
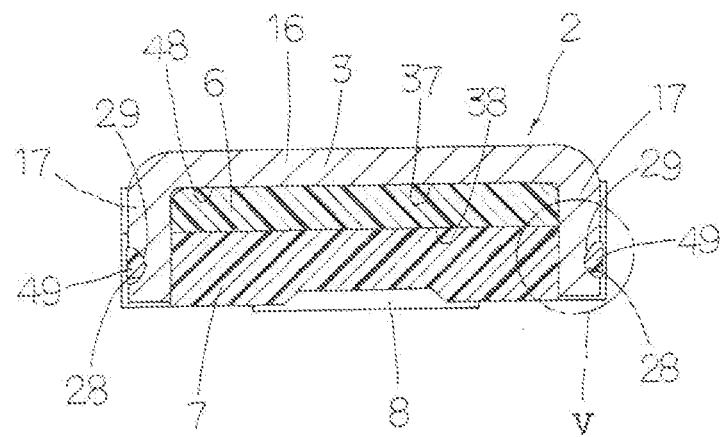
FIG. 4 is a view in transverse section of the slider taken on a plane lying on the line IV-IV of FIG. 2.
Figure 5:
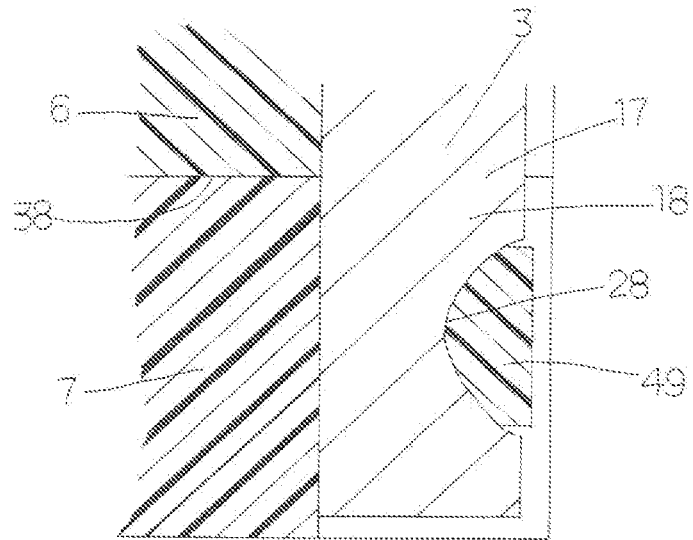
FIG. 5 is a view in enlarged transverse section of an area encircled area V of the slider shown in FIG. 4.
Figure 6:
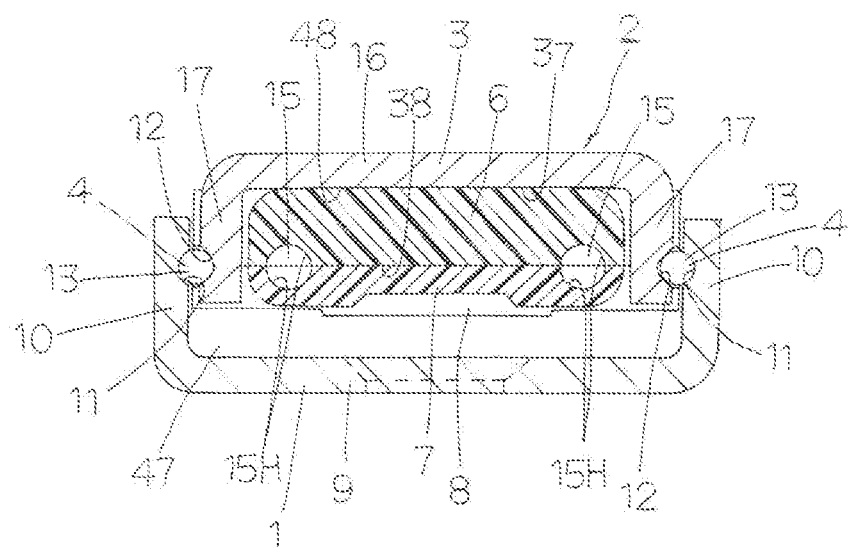
FIG. 6 is a view in transverse section of the slider taken on a plane lying on the line VI-VI of the linear motion guide unit FIG. 1.

The linear motion guide unit according to the present invention is adapted for use in any relatively sliding components in machinery as diverse as semiconductor fabricating equipment, various assembling machines, measurement/inspection instruments, medical machines, robotic machines, micromachines and so on to display the performance of smooth sliding movement and highly precision of the slider. Preferred embodiments of the linear motion guide unit constructed according to the present invention will be described in detail by reference to the drawings.

With the linear motion guide unit of the present invention, an elongated guide rail 1 is formed in a U-shaped configuration in cross-transverse section, which is composed of a pair of lengthwise side walls 10 (first side walls) and a lengthwise bottom 9 connecting the side walls with each other. A slider 2 fits mostly in a recess 47 defined between opposed lengthwise side walls 10 of the guide rail 1 so as to move or slide in a lengthwise direction of the guide rail 1. With the linear motion guide unit constructed as stated earlier, the guide rail 1 is made of stainless steel precisely formed in a U-shaped configuration in transverse section. The slider 2 has a carriage 3 which is also made of stainless steel precisely formed in a U-shaped configuration in transverse section. The guide rail 1 and the carriage 3 cooperate with each other to make a two-row, ball-type endless linear movement. The linear motion guide unit constructed as stated earlier has the total height of for example 6 mm, the slider 2 has the length of 22 mm and the width of the guide rail 1 has 14 mm. Moreover, the slider 2 has no necessity of through-holes and rivets, which are used to rivet the circulator 5 to the carriage 3. With the linear motion guide unit constructed as stated earlier, thus, it is allowed to more simply various parts and components, and moreover they are easier for fabrication. The slider 2 is allowed to reciprocate with more smooth along the guide rail 1. The circulator 5 is allowed to locate relatively to the slider 2. In addition, the guide rail 1 has more than one fastening holes 51 to secure the bottom 9 thereof to the basement or the bed.

With the linear motion guide unit of the present invention, the slider 2 is generally composed of the carriage 3, circulator 5, insert nuts 8 and balls 4 for rolling elements, which are assembled together by means of elastic deformation of snap-fit engagement. Thus, the slider 2 has no necessity of fixture means such as threaded holes, pin holes, pins as in the conventional fixture in the prior slider. More especially, the linear motion guide unit of the present invention is composed of the guide rail 1 of thin steel plate of U-shaped configuration defined with the bottom 9 and the sidewise opposed lengthwise upright side walls 10 to provide a track groove 11 (first track groove), and the slider 2 having a raceway groove 12 (second raceway groove) lying in opposition to the track groove 11. The slider 2 is disposed for sliding movement through the balls 4 of rolling elements inside a recess 47 between the side walls 10 of the guide rail 1. The slider 2 is composed of the carriage 3 of thin steel plate formed in U-shape configuration in transverse section including an upper portion 16 and sidewise opposed side walls 17 (second side walls) depending downward from the sidewise opposed edges of the upper portion 16, the side walls 17 having the track raceway grooves 12 on the outside thereof, the circulator 5 is disposed in a recess 48 between the side walls 17 of the carriage 3 and provided with a turnaround passage 14 communicating with a loaded raceway passage 13 and a return passage 15 communicating with the turnaround passage 14, and the balls 4 of rolling elements allowed to rolling through a circulating circuit composed of the raceway passage 13, turnaround passages 14 and the return passage 15. With the linear motion guide unit constructed as stated earlier, as the carriage 3 is made of thin stainless steel, insert nuts 8 are employed to fasten any counter part such as instruments, works and so on to the slider 2. The insert nuts 8 having a fastening threaded holes 30 are press-fit into through-holes 31 made in the circulator 5. The insert nuts 8 each have a head 45 which is designed to have a circular stepped portion which is allowed to engagement snugly with a circular stepped recess 50 formed around the through-hole 31 of the second circulator half 7.

With the linear motion guide unit of the present invention, the carriage 3 has the raceway groove 12 of a preselected length on the outside middle portion 46 of the side walls 17. The side walls 17 at lengthwise opposite ends thereof is partially cut out to make recesses 19. Further, the side walls 17 has engaging parts 20 at lengthwise opposite ends 18 of the raceway groove in adjacency with the recesses 19. That is, the recesses 19 are made at four locations on the carriage 3. The engaging parts 20 on the carriage 3 are made in adjacency to the recesses 19. A recess 28 to fasten the circulator 5 is cut simultaneously with raceway groove 12 on the carriage 3.

Figure 7:
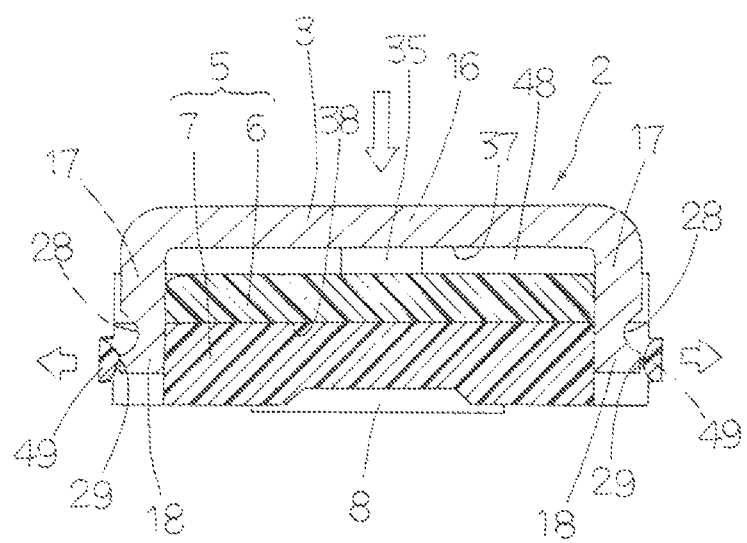
FIG. 7 is a view explanatory of how the circulator is assembled into the carriage in the course of assemblage of the slider of FIG. 2.
Figure 8:
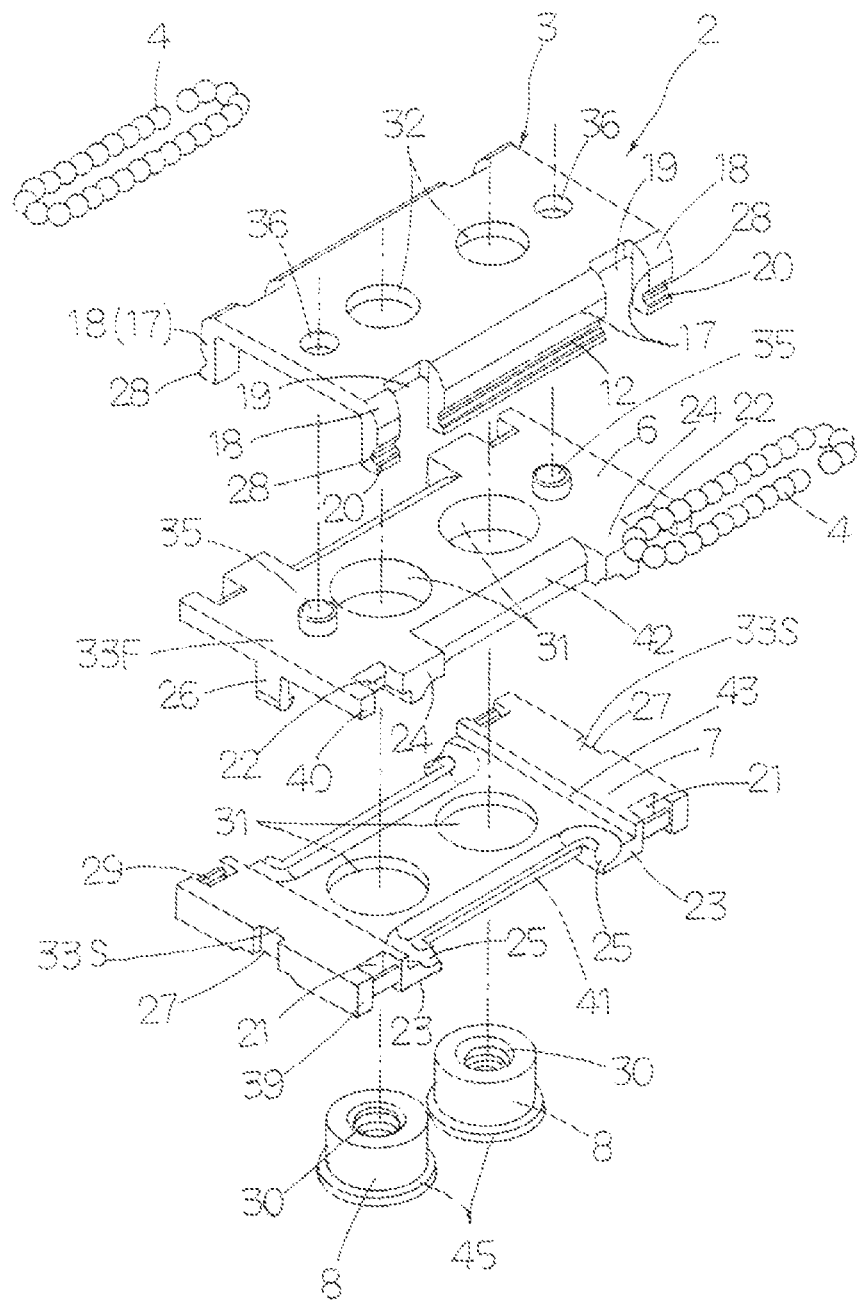
FIG. 8 is an exploded perspective view illustrating components of the slider of FIG. 2, namely, the carriage, first circulator part and second circulator part constituting the circulator, balls for rolling elements, and insert nuts.
Figure 9:
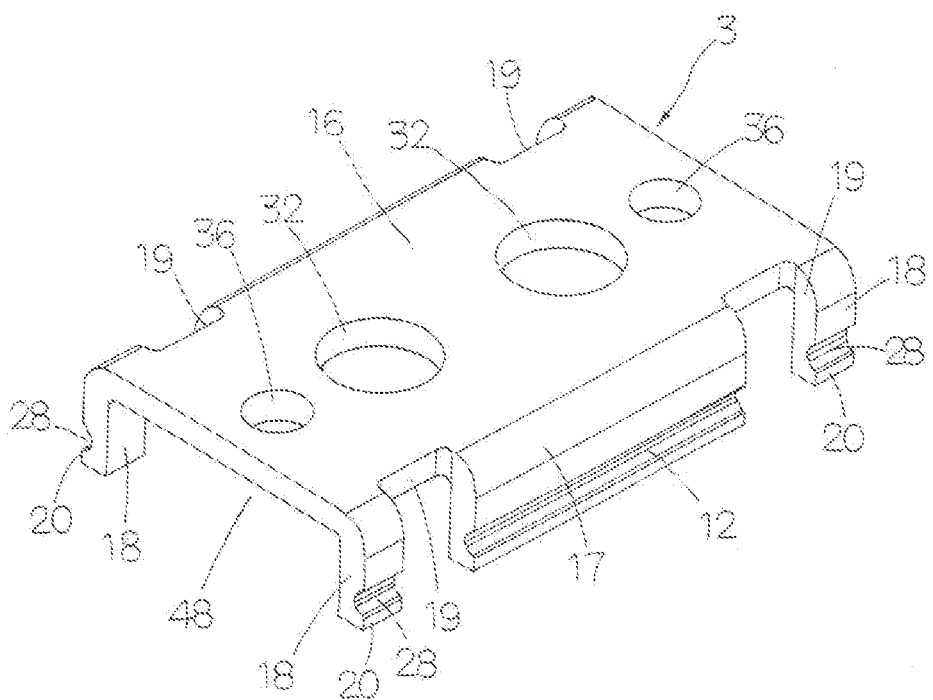
FIG. 9 is an exploded perspective view illustrating the carriage to be assembled in the slider of FIG. 8.
Figure 10:
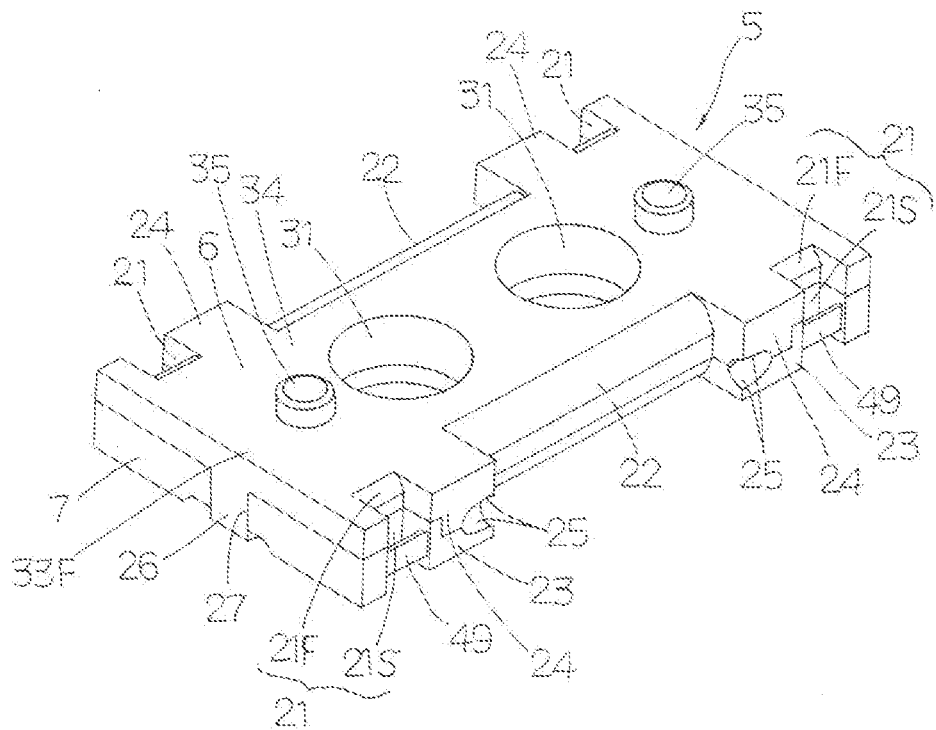
FIG. 10 is a view in perspective illustrating the circulator completed to be assembled in the slider of FIG. 8.
Figure 11:
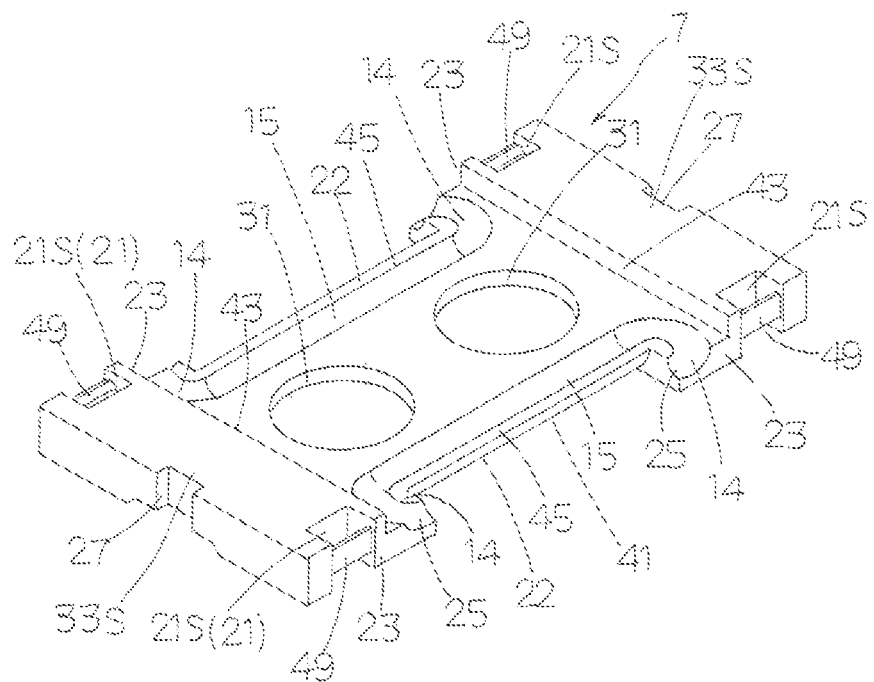
FIG. 11 is a view in perspective showing a second circulator for the circulator assembled in the slider of FIG. 8.
Figure 12:
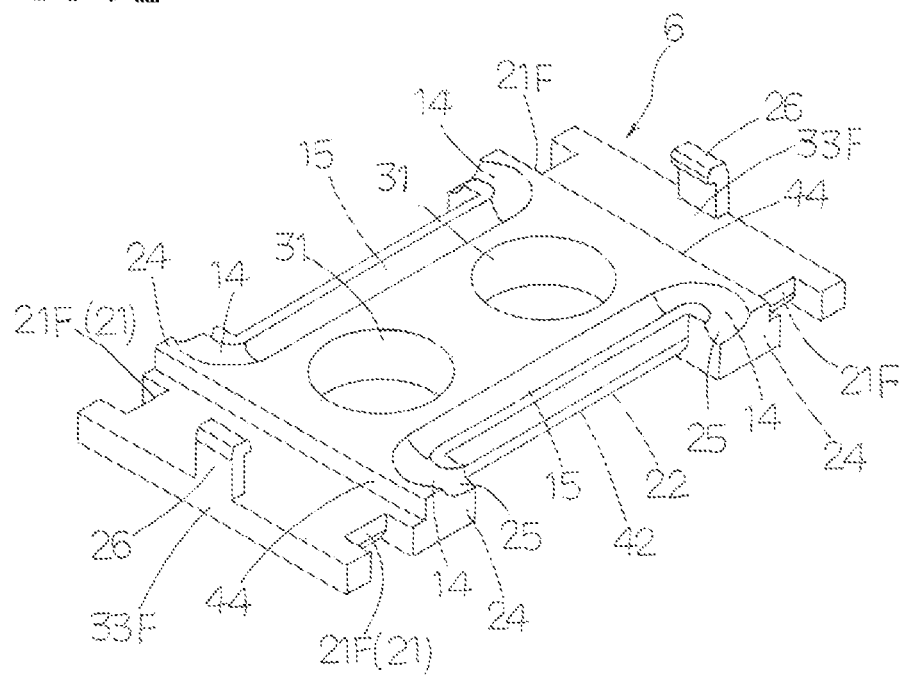
FIG. 12 is a view in perspective showing a first circulator for the circulator assembled in the slider of FIG. 8.
Figure 13:
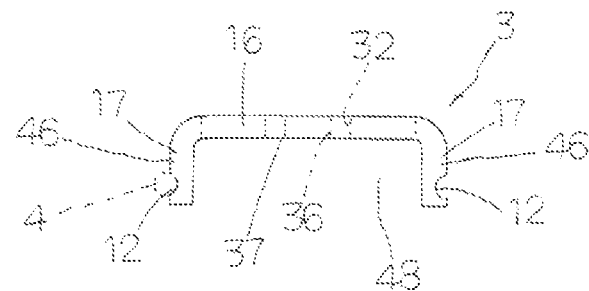
FIG. 13 is a view in front elevation showing the carriage of FIG. 9.
Figure 14:
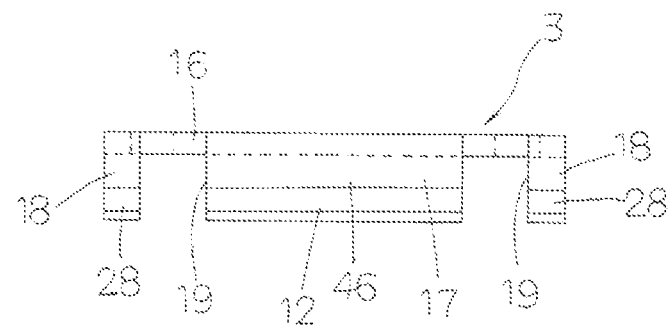
FIG. 14 is a view in side elevation of the carriage of FIG. 9.
Figure 15:
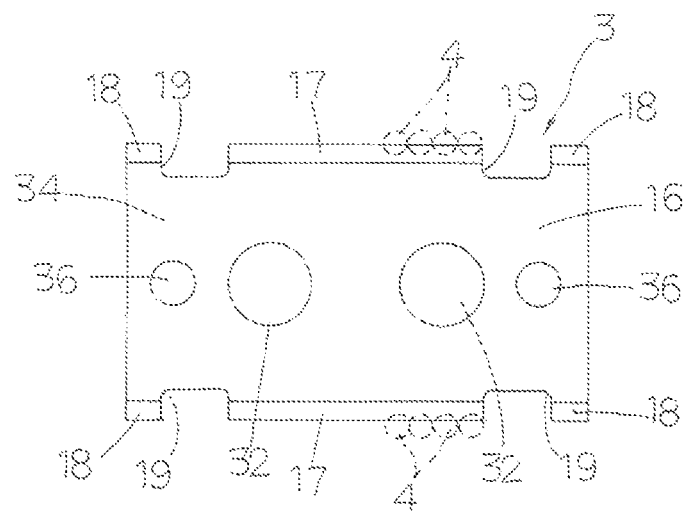
FIG. 15 is a view in front elevation of the carriage of FIG. 9.
Figure 16:
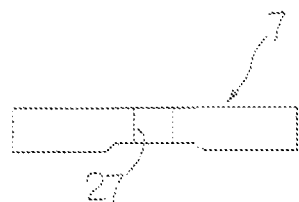
FIG. 16 is a view in front elevation of a second circulator of FIG. 11.
Figure 17:
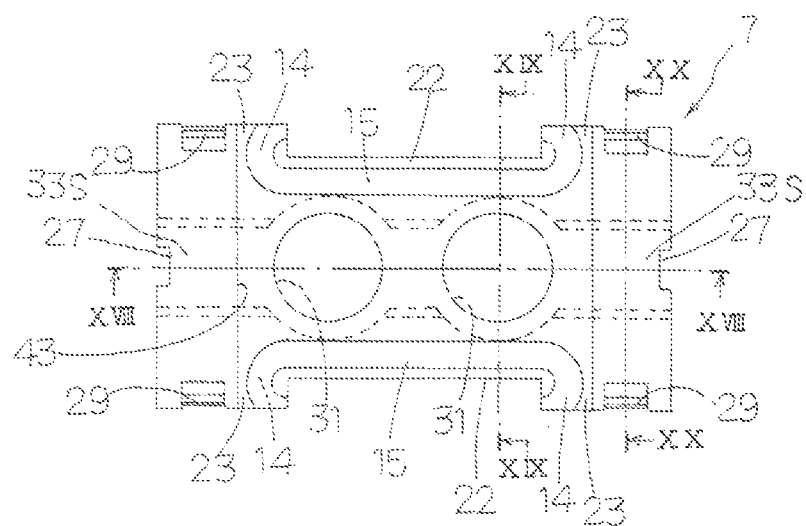
FIG. 17 is a plan view showing a second circulator of FIG. 11.
Figure 18:
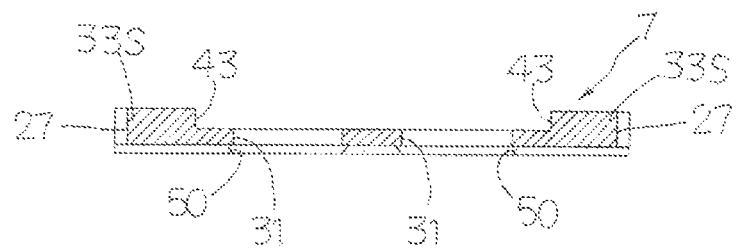
FIG. 18 is a view in transverse section of the second circulator of FIG. 17, the view being taken on a plane lying on the line X VIII-X VIII of FIG. 17.
Figure 19:
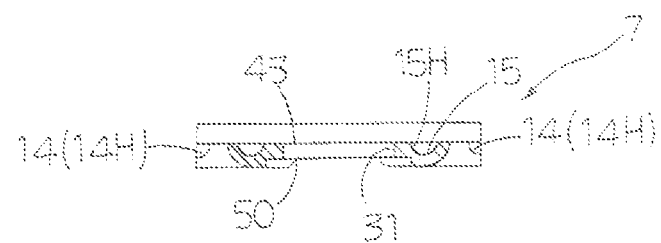
FIG. 19 is a view in transverse section of the second circulator of FIG. 17, the view being taken on a plane lying on the line X IX-X IX of FIG. 17.
Figure 20:
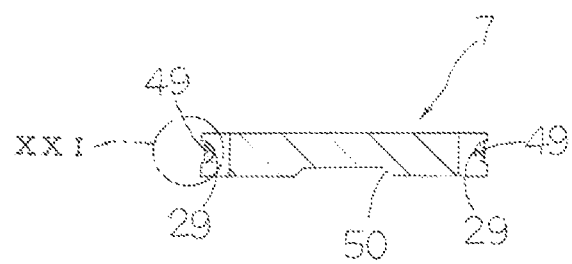
FIG. 20 is a view in transverse section of the second circulator of FIG. 17, the view being taken on a plane lying on the line X X-X X of FIG. 17.
Figure 21:
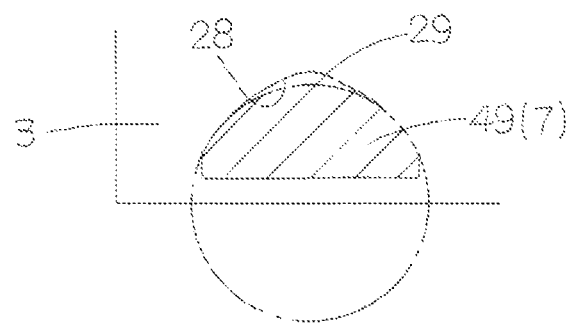
FIG. 21 is an enlarged fragmentary view in transverse section of an area encircled with a sign X X I of the second circulator of FIG. 20.
Figure 22:
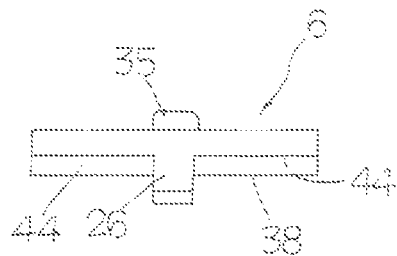
FIG. 22 is a view in front elevation showing the first circulator of FIG. 8.
Figure 23:
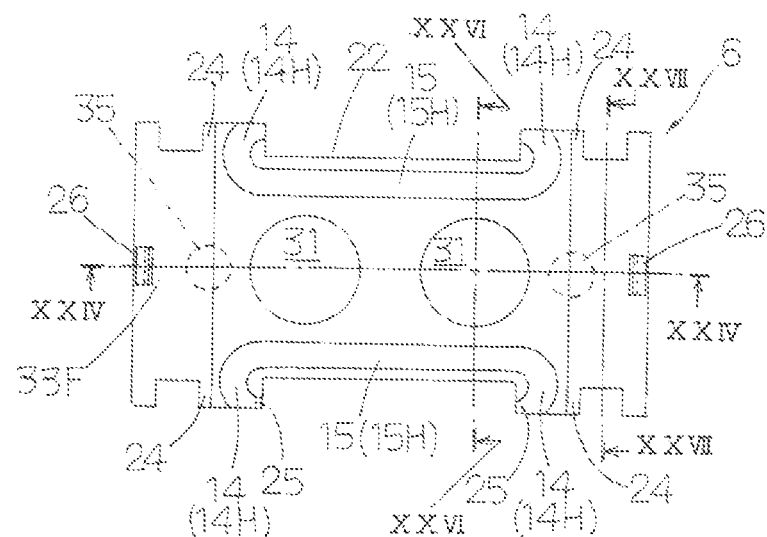
FIG. 23 is a view in plan elevation showing the first circulator of FIG. 8.
Figure 24:
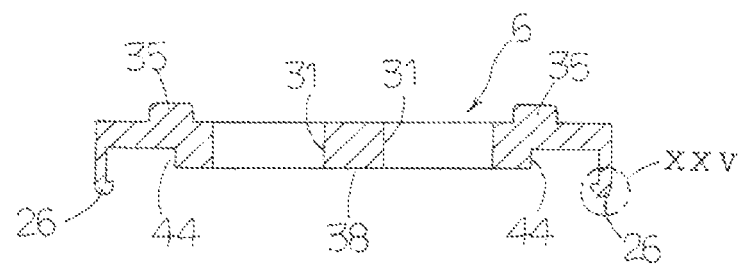
FIG. 24 is a view in transverse section of the first circulator of FIG. 23, the view being taken on a plane lying on the line X X IV-X X IV of FIG. 23.
Figure 25:
FIG. 25 is an enlarged fragmentary view in transverse section of an area encircled with a sign X X V of the first circulator of FIG. 24.
Figure 26:
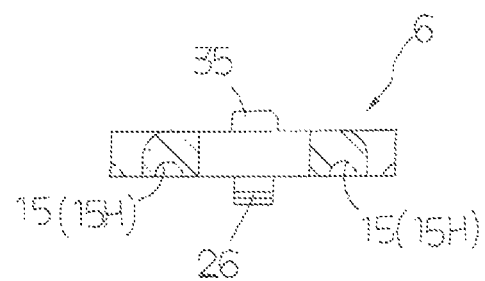
FIG. 26 is a view in transverse section of the first circulator, the view being taken on a plane lying on the line X X VI-X X VI of the first circulator of FIG. 23.
Figure 27:
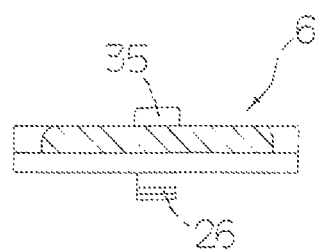
FIG. 27 is a view in transverse section of the first circulator, the view being taken on a plane lying on the line X X VII-X X VII of the first circulator of FIG. 23.
Figure 28:
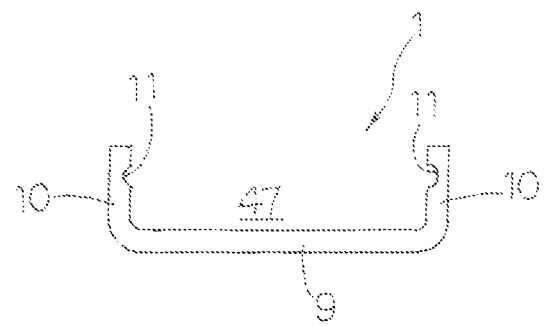
FIG. 28 is a view in front elevation showing the guide rail incorporated in the linear motion guide unit of FIG. 1.
Figure 29:
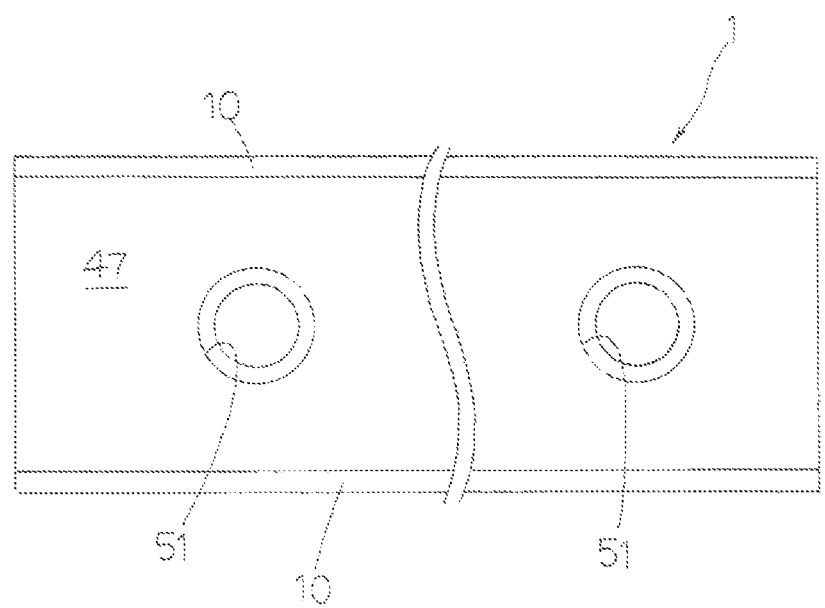
FIG. 29 is a view in plan showing the guide rail incorporated in the linear motion guide unit of FIG. 1.
Figure 30:
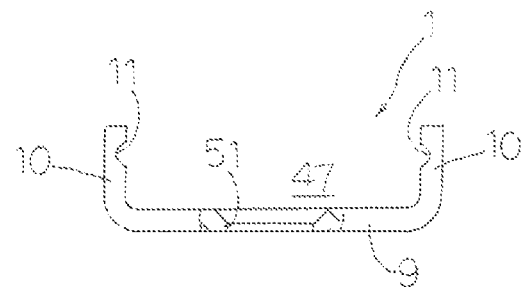
FIG. 30 is a view in front elevation partly in section showing the guide rail incorporated in the linear motion guide unit of FIG. 1.
Figure 31:
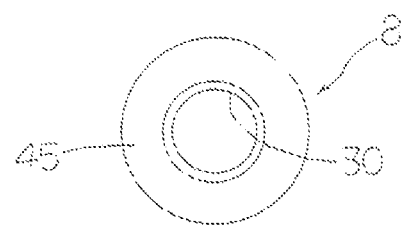
FIG. 31 is a plan view showing an insert nut incorporated in linear motion guide unit of FIG. 1.
Figure 32:
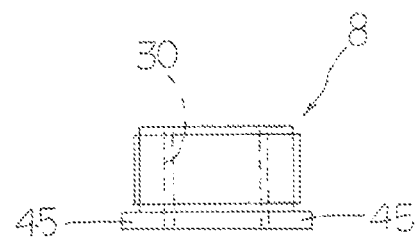
FIG. 32 is a view in front elevation showing an insert nut incorporated in the linear motion guide unit of FIG. 1.

The circulator 5 is composed of first and second circulator half 6 and 7, each of which has a semicircular half curved passage 14H for the turnaround passage 14 and a semicircular half linear passage 15H for the return passage 15. With the circulator 5 constructed as stated earlier, after hooked portions 26 made widthwise midway the opposite ends 33 of one of the circulators 5 have made snap-fit engagement with recesses 27 made widthwise midway the opposite ends 33 of another of the circulators 5, the adjoining circulators 5 are fastened each other. More especially, the snap-fit engagement as recited above means that the hooked portion 26 makes engagement with the corresponding recess 27 under elastic deformation. With the version recited earlier, the first circulator half 6 at the opposite ends 33F thereof has the hocked portions 26 lying midway between widthwise opposite side edges of the circulator half 6. The second circulator half 7 at the opposite ends 33S thereof has the recesses 27 lying midway between widthwise opposite side edges of the circulator half 6. After the snap-fit engagement has been made between the hooked portions 26 and their corresponding recess 27, the first circulator half 6 and the second circulator half 7 are fastened each other. More especially, the first circulator half 6 at opposite ends 33F thereof has recesses 21F and the second circulator half 7 has holes 21S at locations matching with the recesses 21F. More especially, it will be said that the holes 21 in the circulator 5 is formed with a recess 21F in the first circulator half 6 and another recess 21S in the second circulator half 7. Outside the recess 21S of the second circulator half 7, there is provided a crossbeam 49 to define a convex wall surface 29 which is allowed to fit into the recess 28 of the engaging part 20 made at opposite ends 18 of the side walls 17 of the carriage 3, moreover, the convex surface 29 of the crossbeam 49 of the second circulator half 7 is made substantially identical in shape with a transverse configuration of the recess 28 formed at ends 18 of the side walls 17 of the carriage 3. With the linear motion guide unit constructed as stated earlier, the slider 2 will be completed as shown in FIG. 8 after engaging parts 20 at lengthwise opposite ends 18 of side walls 17 of the carriage 3 has fit-engaged with the holes 21 in the circulator 5 and the recesses 28 formed at ends 18 of the side walls 17 make engagement with the convex surface of the fastening crossbeam 49 of the second circulator half 7. Moreover, FIG. 7 illustrates a phase in which the crossbeam 49 of the second circulator half 7 in the circulator 5 is subject to the elastic deformation to get the convex wall surface 29 closer to the recesses 28.

With the linear motion guide unit of the present invention, after the engaging parts 20 of the carriage 3 has made engagement in the holes 21 of the circulator 5, the carriage 3 and the circulator 5 are subject to elastic deformation to make snap-fit to be fastened each other. Thus, the engaging parts 20 of the carriage 3 and the holes 21 of the circulator 5 are subject to the elastic deformation to make snap-fit each other to fasten in place the circulator 5 to the carriage 3. With the linear motion guide unit of the present invention, moreover, the carriage 3 has a pair of the recesses 19 spaced away from each other in lengthwise direction of the carriage 3. The circulator 5 has sidewise lugs 23, 24 designed to fit into the recesses 19 of the carriage 3. The sidewise lugs 23, 24 each have a scooping part 25 to scoop up the balls 4 rolling through the raceway passage 13 and then introduce them into the turnaround passages 14. The scooping part 25 fits into the recesses 19 of the carriage 3 to communicate with the raceway groove 12. With the circulator 5 constructed as stated earlier, the first circulator half 6 has lugs 24 spaced away from each other, and a cut-away location 22 is made between the lugs 24. Moreover, the second circulator half 7 has lugs 23 spaced away from each other, and a cut-away location 22 is made between the lugs 23. The circulating circuit in the slider 2 to allow the balls 4 to run through there is made between mating surfaces 23, 24 of the circulator 5. The raceway groove 12 at their opposite ends communicates the scooping part 25 made at the mating surfaces 23, 24 of the circulator 5.

With the linear motion guide unit of the present invention, moreover, the recess 28 identical with the raceway groove 12 on transverse section is made to extend lengthwise on the extension of the raceway groove 12 outside the engaging parts 20 made on the side walls 17 of the carriage 3. On one side of rectangular section of the hole 21 of the circulator 5, there is provided the convex wall surface 29 which is allowed to fit into the recess 28 of the engaging part 20. After the convex wall surface 29 to form a wall surface of the hole 21 has fitted into of the recess 28 of the engaging part 20, the circulator 5 is fastened mutually to the carriage 3. Moreover, the slider 2 has insert nuts 8 which have threaded holes 30 used to fasten any counterpart such as works, instruments and so on. The circulator 5 has through-holes 31 (first through-holes) to press-fit the insert nuts 8 therein. The insert nut 8 is subject to knurling process at the press-in part thereof forced into the through-hole 31 of the circulator 5 to have the locking structure. Moreover, the carriage 3 has through-holes 32 (second through-holes) lying at the same position with the through-holes 31 and having the size smaller than the outer diameter of the insert nut 8 but larger than the fastening threaded hole 30. With the linear motion guide unit constructed as stated earlier, the through-hole 31 in the circulator 5 and the through-hole 32 in the carriage 3 lie at widthwise midway in pairs along the lengthwise direction. Moreover, the insert nut 8 is press-fit into the circulator 5 to be fastened to the slider 2. Although the insert nut 8 is fastened to the slider 2 after the counterpart such as the work, instruments and so on has threaded into the fastening threaded hole 30 of the inert nut 8, the insert nut 8 is kept against coming out from the slider 2 even if experiencing any tensile force of the counterpart from the carriage 3.

With the circulator 5, the first circulator half 6 has hocked portions 26. Further, the first circulator half 6 has on an upper surface 34 thereof locating knock-pins 35, which are used to fit into locating holes 36 in the carriage 3 to locate the first circulator half 6 underneath a lower surface 37 of the carriage 3. The locating knock-pins 35 formed on the upper surface 34 of the first circulator half 6 are made in pairs nearer to ends than the paired through-holes 31. Likewise, the locating holes 36 in the carriage 3 are made nearer to the ends than the paired through-holes 32 linearly in axially alignment with the through-holes 32. With the linear motion guide unit of the present invention, after the knock-pins 35 have fit into locating holes 36, the circulator 5 is positioned in place and arranged there. Moreover, the second circulator half 7 has the recess 27 to make engagement with the hooked portions 26 of the first circulator half 6, and the holes 21 to fit over the engaging part 20 of the carriage 3. The second circulator 7 is arranged to make engagement with a lower surface 38 of the first circulator half 6. Then the hooked portion 26 makes resiliently the snap-fit with the recess 27 to make integrally the circulator 5. With the first circulator half 6, moreover, the opposite side ends 40 lying outer than the raised step 44 are made thinner than a middle area 42 (first middle portion). With the second circulator half 7, the opposite side ends 39 having the holes 21 lying outer than the raised step 44 are made thicker than a middle area 41 (second middle portion), and the middle portion having the turnaround passage 14 and the return passage 15 is made larger in thickness the middle portion 42 of the first circulator 6. With the construction as stated earlier, the first circulator 6 and the second circulator half 7 fit each other in a row in alignment each other. With the first circulator half 6 thus, the boundary between the end 40 and the middle portion 42 is made in raised step 44 in such a way the middle area 42 lying between the opposite ends 40 is raised. With second circulator half 7, moreover, the boundary between the end 39 and the middle portion 41 is made recessed to make a concaved step 43, so that the middle area 42 of the first circulator half 6 is arranged to fit in the middle portion 41 of the second circulator half 7 to make in-row fit each other.

What is claimed is:

1. A linear motion guide unit, comprising a guide rail of U-shaped configuration in transverse section having a bottom and longitudinal upright first sides extending side edges of the bottom and having on inside surface thereof first raceway grooves extending lengthwise of the first upright sides, and a slider having second raceway grooves extending in opposition to the first raceway grooves, and the slider being disposed between first sides for sliding movement to move through passage rolling elements in load passages defined between the first raceway groove and the second raceway groove, the slider having a carriage, circulator and a rolling element, the carriage of thin steal plate being made in a U-shape in transverse section composed of an upper section and second side walls depending downwards from widthwise opposed side edges of the upper section and having the second raceway grooves on the outside surfaces thereof, the circulator arranged between the second side walls and having turnaround passages communicating with the load passage and a return passage communicating with the turnaround passages, and the rolling element running through a circulating passage composed of the load passage, turnaround passages and the return passage, and the carriage having the second side walls having the second raceway groove of a preselected length at an outside middle area thereof and further having cut-out portions at the lengthwise opposite ends of the second raceway groove, engaging parts at lengthwise opposite ends of the second raceway grooves, and the circulator having holes to fit over the engaging parts of the carriage whereby after the engaging parts of the carriage have fit in and engaged with the holes of the circulator, the carriage makes snap-fit over the carriage to make secure fixture between the carriage and the circulator.

2. A linear motion guide unit constructed as defined in claim 1, wherein a mating part of the circulator to fit into the cut-out portion of the carriage has a scooping part to scoop the rolling elements out of the load raceway into the turnaround passages and wherein the scooping part fits into the cut-out portion of the carriage to make communications to the second raceway groove.

3. A linear motion guide unit constructed as defined in claim 1, wherein a recess identical in transverse section and in configuration with the second raceway groove on transverse section is made to extend lengthwise on an extension of the second raceway groove outside the engaging part made on the second side walls of the carriage, there is provided the convex wall surface which is allowed to fit into the recess of the engaging part, and on one side of rectangular section of the hole of the circulator, and further there is provided the convex wall surface which is allowed to fit into the recess of the engaging part, after the convex wall surface to form a wall surface of the hole has fitted into of the recess of the engaging part, the circulator is fastened mutually to the carriage.

4. A linear motion guide system constructed as defined in claim 1, wherein the slider has insert nuts which have threaded holes used to fasten any counterpart, the circulator has first through-holes to press-fit the insert nuts therein, and the carriage has second through-holes lying at the same position with the first through-holes and having a size smaller than an outer diameter of the insert nut but larger than the fastening threaded hole.

5. A linear motion guide unit constructed as defined in claim 4, wherein the first through-hole in the circulator and the second through-hole in the carriage lie at widthwise midway in pairs along the lengthwise direction.

6. A linear motion guide unit constructed as defined in claim 1, wherein the circulator is composed of first and second circulator halves made of synthetic resins, each of which has a semicircular half curved passage for the turnaround passage and a semicircular half linear passage for the return passage, and after hooked parts made widthwise midway the opposite ends of one of the circulators have made snap-fit engagement with recesses made widthwise midway the opposite ends of another of the circulators, the adjoining circulators are fastened each other.

7. A linear motion guide unit constructed as defined in claim 6, wherein a boundary between the end and the first middle portion in the first circulator is made in raised step in such a way a first middle area lying between the opposite ends is raised, and a boundary between the end and the second middle portion in the second circulator is made recessed to make a concaved step, so that the middle area of the first circulator is arranged to fit in the middle portion of the second circulator.

8. A linear motion guide unit constructed as defined in claim 6, wherein the first circulator has hocked portions and further the first circulator has on an upper surface thereof locating knock-pins, which are used to fit into locating holes in the carriage to locate the first circulator underneath a lower surface of the carriage, and the second circulator has the recess to fit over the engaging part to make engagement with the hooked portion of the first circulator to lay the second circulator underneath the first circulator, and further the second circulator has the hole into which the engaging part of the carriage fits to be fastened to the carriage with the snap-fit engagement.

9. A linear motion guide unit constructed as defined in claim 8, wherein opposite sides of the second circulator having the through-holes are made thicker than opposite sides of the first circulator, and a middle portion having the turnaround passage and the return passage is made thinner in thickness than the first circulator, and the first circulator and the second circulator are in alignment with each other to make in-row fitness.

* * * * *